Figure 1:
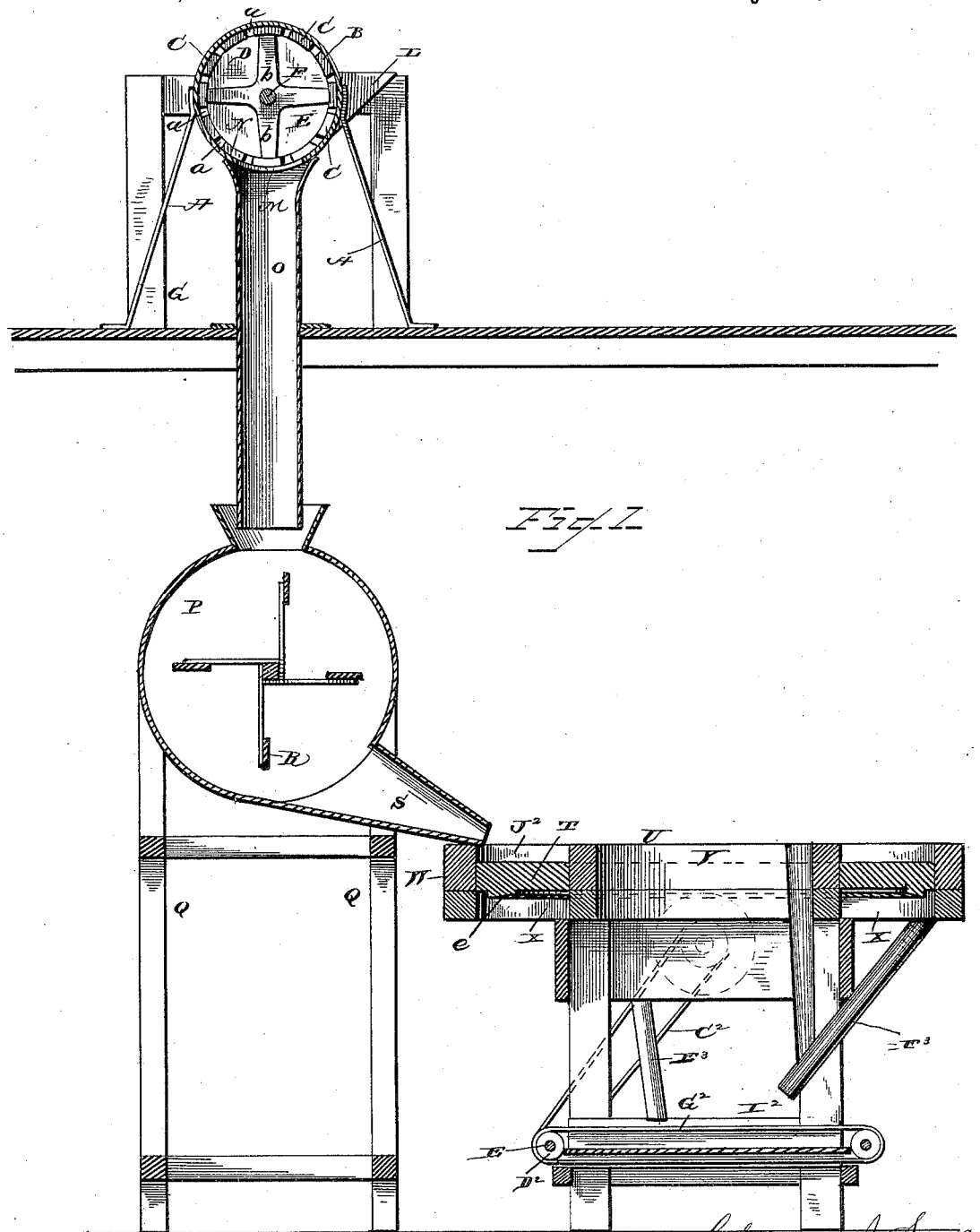

(No Model.) 3 Sheets—Sheet 1.
C. J. SYME.
MACHINE FOR CLEANING PEANUTS.

No. 302,873. Patented July 29, 1884.

WITNESSES
Franck L. Ourand.
Edw. G. Siggers.

Chapman J. Syme
INVENTOR
by C. A. Snow & Co.
Attorneys

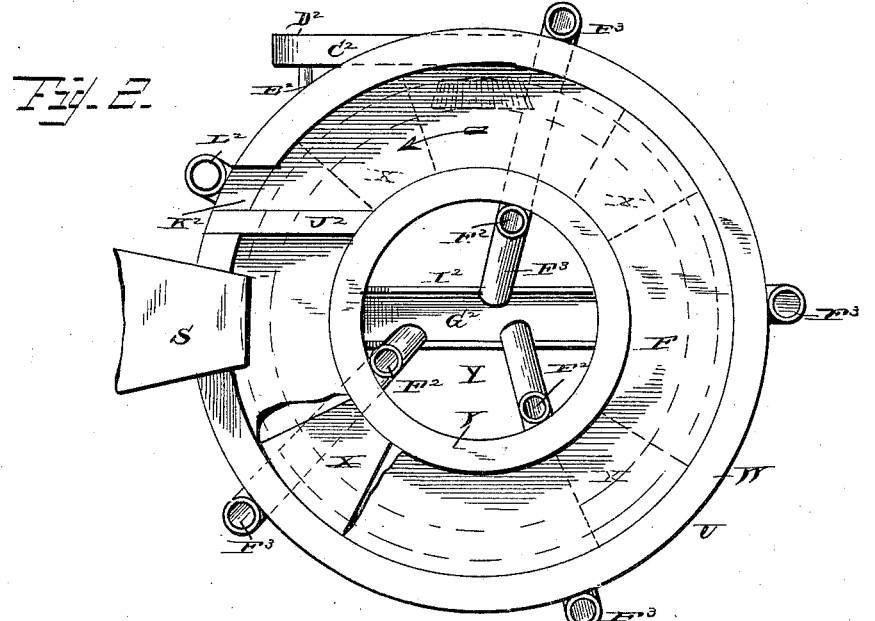
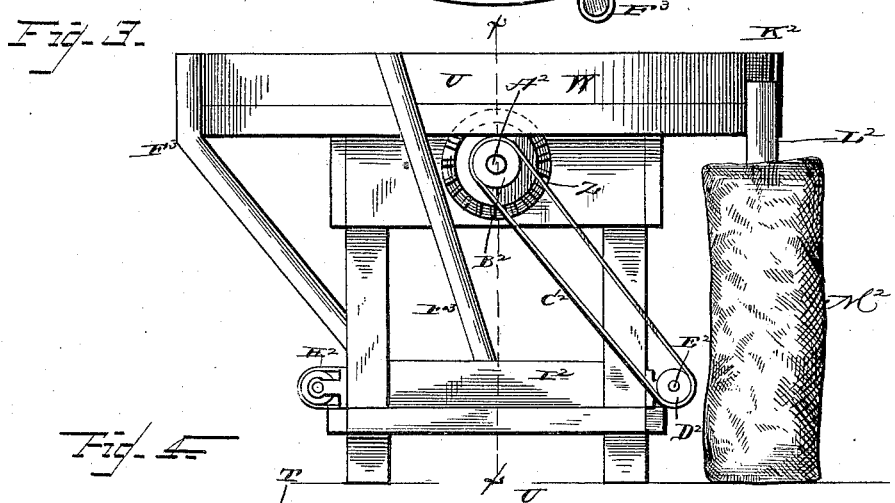
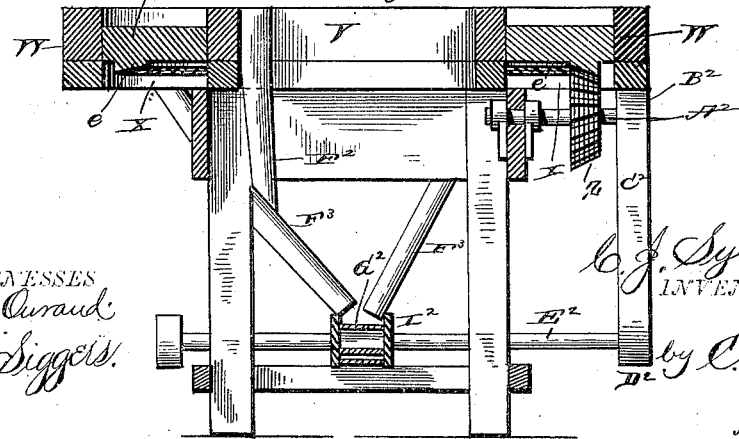

(No Model.) 3 Sheets—Sheet 3.
C. J. SYME.
MACHINE FOR CLEANING PEANUTS.
No. 302,873. Patented July 29, 1884.
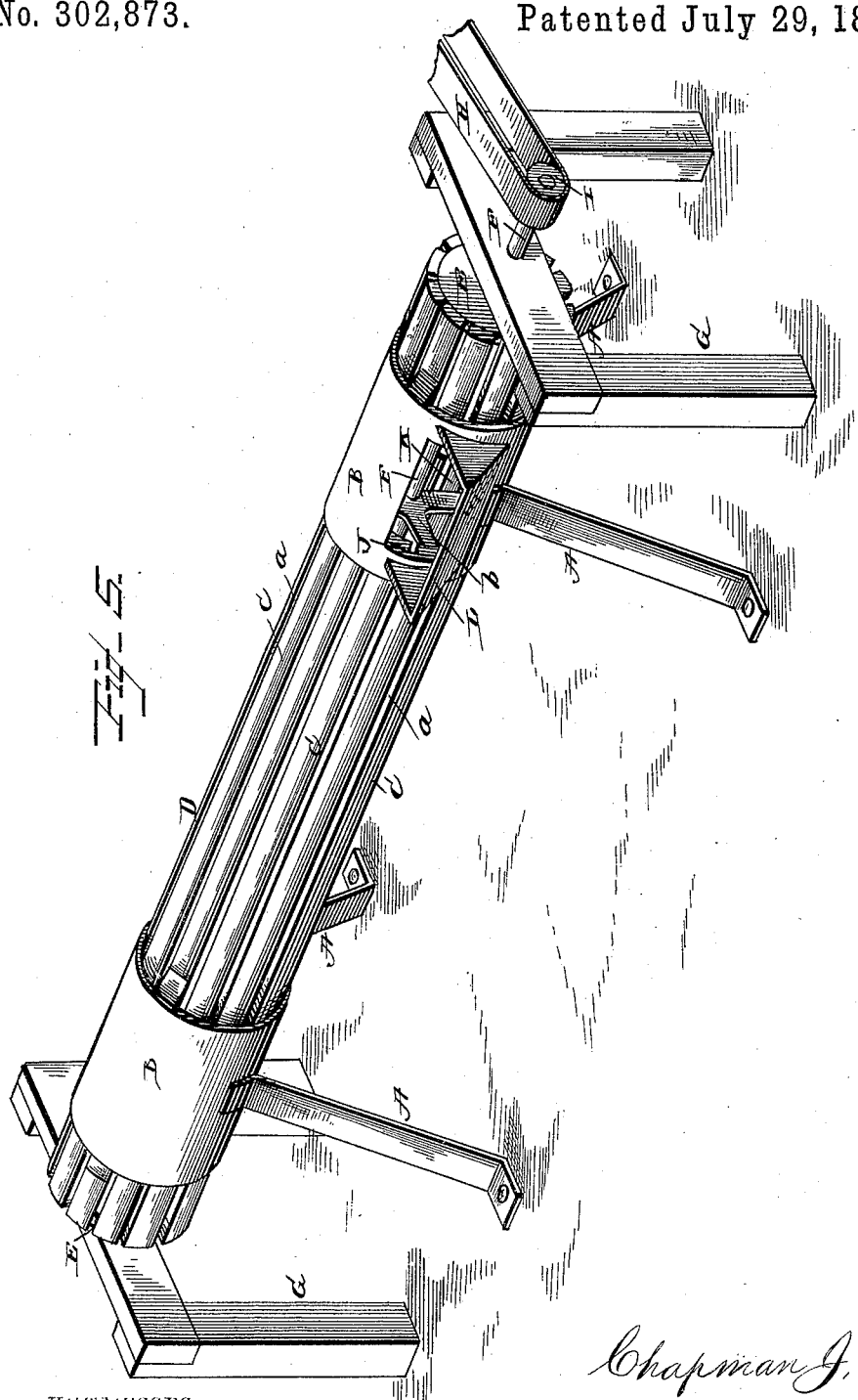
WITNESSES
Franck L. Ourand
E. G. Siggers
Chapman J. Syme
INVENTOR
by C. A. Snow & Co.
Attorneys

UNITED STATES PATENT OFFICE.

CHAPMAN JOHNSON SYME, OF PETERSBURG, VIRGINIA, ASSIGNOR OF ONE-HALF TO ROBERT C. MARKS, OF SAME PLACE.

MACHINE FOR CLEANING PEANUTS.

SPECIFICATION forming part of Letters Patent No. 302,873, dated July 29, 1884.

Application filed April 15, 1884. (No model.)

*To all whom it may concern:*

Be it known that I, CHAPMAN J. SYME, a citizen of the United States, residing at Petersburg, in the county of Dinwiddie and State of Virginia, have invented a new and useful Machine for Cleaning Peanuts, of which the following is a specification, reference being had to the accompanying drawings.

This invention relates to mechanism for cleaning peanuts; and it has for its object to provide means for thoroughly rubbing or cleaning the nuts without breaking the same, in the manner hereinafter explained.

Heretofore in peanut-cleaners a revolving cylinder has been employed open at one or both ends, the peanuts being fed by a suitable hopper through one end of the cylinder and discharged through the other end. This arrangement has been found to be objectionable, for the reason that the nuts escape through the discharge-opening without being thoroughly rubbed, the open end permitting the nuts to escape too readily. I overcome this objection by feeding the revolving cylinder at one side and discharging the nuts at the bottom, and in this manner I utilize both ends and the sides of the cylinder to rub the nuts, the latter being retained longer in the cylinder than if emptying on a direct line, thereby causing the nuts to be more thoroughly rubbed and cleaned than by the cylinders now in use.

With these and other objects in view the said invention consists in certain details of construction and combination of parts, as hereinafter set forth, and particularly pointed out in the claims.

In the accompanying drawings, Figure 1 is a sectional view of my improved apparatus, the cleaning devices being shown as arranged on one floor of a building, and communicating with the assorting devices on the floor below. Fig. 2 is a plan view of the table. Fig. 3 is a side view of the same. Fig. 4 is a vertical sectional view on the line $x x$, Fig. 3. Fig. 5 is a perspective view of the cleaning-cylinder, the discharge-chute not being shown in this view.

Like letters are used to indicate corresponding parts in the several figures.

Referring to the drawings, A A designate inclined uprights or standards projecting up from the floor, and having stationary sleeves B B secured at their upper ends. A revolving cylinder, D, works through the sleeves, and is constructed of a series of staves or slats, C C, secured in any suitable manner to heads E E, the slats being arranged at equal distances apart, so as to leave spaces $a$ between the same to permit the passage of dust and other particles of matter rubbed and dropped from the nuts. A shaft, F, extends longitudinally through the cylinder, and is secured at its ends to the heads E thereof, and journaled in frames G G, mounted on the floor, a series of arms, $b\ b$, being secured on the shaft within the cylinder, and near the ends thereof, and projecting radially outward, said arms having their ends attached to the inner sides of the cylinder, and not only serving as a support for the shaft, but acting as a means of connection between the cylinder and the shaft, so that when the shaft is operated motion will be imparted to the cylinder. It will also be seen that, the arms being near the feed and discharge openings and near the heads of the cylinder, they will impede the passage of the nuts and prevent the same from passing directly from the feed to the discharge opening without being rubbed by the heads and sides of the cylinder. A band, H, is arranged to connect with a pulley, I, formed on one end of the shaft F, said band being operated by any suitable power. An opening, J, is formed in one side of one of the sleeves B, said opening communicating with a circumferential opening, K, of the cylinder, a suitable hopper, L, being formed on the sleeve around the opening J, and arranged to supply the cylinder with peanuts, the opening K in the cylinder communicating, as the latter rotates, with the opening J in the sleeve, so that the feeding to the cylinder will be continuous. An opening, M, is formed in the bottom of the other sleeve, B, and communicates with a circumferential opening, N, at the other end of the cylinder, a chute, O, connecting with the opening M, and extending through the floor to the room below, to the fan-cylinder P, as hereinafter explained.

It will be seen that the peanuts are fed at the side and emptied at the bottom of the cylinder, and, since the arms $b$ are arranged near the feed and discharge openings, they impede the direct course of the nuts, so that they will be driven against the feed end of the cylinder, and by the motion of the cylinder forced gradually along the side down to the closed end near the discharge-opening, the revolution of the cylinder causing the nuts to work in a straight line down toward the closed end, against which the nuts are forced. Since the discharge-opening is at the bottom, a very small portion only can escape at a time through the same, the discharge of the nuts being very slow in comparison to the cylinders which discharge at the end, since the natural tendency of the nuts when in the revolving cylinder is to work toward the closed end. As the nuts are retained in my cylinder longer than those now in use, the opening being at the bottom, the result is that the nuts circle around the opening, are worked against each other and against the closed end of the cylinder, and, finally, the nuts which have reached the nearest to the discharge-opening are permitted to escape through the same.

In the ordinary construction of cylinder, where the nuts are fed at one end and discharge at the other end, the ends are not utilized to effect the rubbing of the nuts, as in my improved cleaner, where the material is fed at the side and discharged at the bottom, the ends being closed, and the arrangement of the openings being such that the natural tendency of the nuts, as the cylinder revolves, is to move toward the closed ends of the cylinder.

The fan-cylinder P is constructed in any suitable manner, and mounted on suitable standards Q Q, a suitable fan, R, revolving in said cylinder to create a current or draft of air to blow the broken shells, dust, and other particles from the material out through a suitable opening in the side of the fan-cylinder, this opening not being shown in the drawing. A chute, S, connects with the fan-cylinder, and is arranged to deliver the cleaned material directly on a revolving bottom, T, of a table, U, the latter comprising inner and outer circular rims, V W, connected at the bottom by strips X, a circular space, Y, being inclosed by the inner rim, V, and arranged to receive a suitable number of pickers. The revolving bottom T is circular in form, and is adapted to fit the space between the rims V W, and rest loosely on the strips X, a circumferential series of teeth, $e$, being formed on the under side of the bottom T, a gear-wheel, Z, mounted on a shaft, $A^2$, engaging with the teeth $e$ to effect the rotation of the bottom. One end of the shaft $A^2$ is provided with a pulley, $B^2$, around which a band, $C^2$, is passed and connects with another pulley, $D^2$, on a horizontal shaft, $E^2$, mounted in the supporting-frame of the table, the other end of the shaft $E^2$ being provided with a band-pulley or gear-wheel connecting with any suitable power. It will be seen that the rotation of shaft $E^2$ effects, by means of the intervening mechanism, the rotation of the bottom on which the peanuts are delivered, the pickers (generally girls) being arranged around the table, and standing on the floor on each side of the carrier, in the circular space Y, to pick the bad nuts, broken shells, and other refuse matter from the bottom, and deposit the same in chutes $F^2$ $F^3$, secured at intervals around the outer rim, W, and inner rim, V, the chutes $F^2$ of the rim V connecting with the chutes $F^3$ of the rim W, the said chutes $F^3$ curving downward and delivering the refuse matter upon the apron $G^2$ of a carrier, $I^2$, the latter being driven by the shaft $E^2$. A bag, basket, or other receptacle may be arranged at the discharge end $H^2$ of the carrier, to receive the refuse material. The carrier is mounted on the supporting-frame of the table, and is constructed in any suitable manner to perform the functions stated. A bar, $J^2$, extends across and connects the inner and outer rims, V W, a passage, $K^2$, being formed in the rim W, near the point where the bar is secured, a chute, $L^2$, communicating with said passage, and arranged to deliver the good peanuts into a bag, $M^2$, or other receptacle, held there for that purpose.

The operation of my invention will be readily understood from the foregoing description taken in connection with the annexed drawings. The peanuts are supplied to the hopper of the revolving cylinder, the action of the same causing the nuts to be thoroughly rubbed against the sides and ends of the cylinder until the nuts are discharged through the chute O into the fan-cylinder. The fan then drives off the broken shells, dust, and other small particles from the material, which descends through the chute S upon the revolving bottom T. The pickers then pick the worthless nuts and shells out and deposit the same in the chutes $F^2$ $F^3$, leading to the carrier, which conveys the same to a suitable receptacle, while the good nuts are left on the revolving bottom, and are carried around to the starting-point, and enter the passage $K^2$, and pass through the chute $L^2$ into a bag or other receptacle with which the chute communicates. It will thus be seen that the peanuts are cleaned and assorted, the good peanuts being deposited into bags for sale or transportation, while the nuts that have been picked out may be again assorted, as found desirable.

The above-described mechanism is simple, efficient, and thoroughly practicable, the parts being worked together with ease and without any danger of getting out of order.

By means of the mechanism shown the pickers will not become dizzy at work, since the revolving bottom will be run at a slow speed, and as the pickers can lean on the inner and outer rims, V W, they will be afforded needed rest while at work.

The assorting-table herein shown and described, not being claimed in this application, has been incorporated in a separate application, Serial No. 133,582, filed June 2, 1884.

Having described my invention, I claim—

1. The herein-described cleaning-cylinder for peanuts, consisting of a revolving cylinder having its ends or heads closed, circumferential openings near the ends of the cylinder, a hopper arranged on one side of the cylinder and communicating with the opening at one end thereof, and a discharge spout or chute arranged below the cylinder and communicating with the opening at the other end, arranged and operating so as to provide a side feed and bottom discharge for the cylinder, as set forth.

2. The herein-described cleaner for peanuts, consisting of suitable standards having tubular sleeves secured at their upper ends, a revolving cylinder turning in the sleeves, and having closed heads, a hopper communicating with the side of the cylinder, a discharge-opening at the rear end of the cylinder at the bottom, and a shaft supported within the cylinder, and means for operating the same, as set forth.

3. The herein-described cleaner, consisting of suitable standards having sleeves secured at their upper ends, a revolving cylinder turning in the sleeves and having its heads closed, a shaft supported within the cylinder and extending out through the ends thereof, operating means for the shaft, circumferential openings near the ends of the cylinder, a hopper secured to the side of the sleeve and communicating with the opening at one end of the cylinder, and a discharge-opening in the bottom of the other sleeve connecting with the opening at the other end of the cylinder, as set forth.

In testimony that I claim the foregoing as my own I have hereto affixed my signature in presence of two witnesses.

CHAPMAN JOHNSON SYME.

Witnesses:
 WAVERLY WILKINS,
 R. O. EGERTON.